(12) United States Patent
Revanur et al.

(10) Patent No.: US 10,931,825 B2
(45) Date of Patent: Feb. 23, 2021

(54) CONTACT CENTER INTERACTION ROUTING USING MACHINE LEARNING

(71) Applicant: Cisco Technology, Inc., San Jose, CA (US)

(72) Inventors: Ambareesh Revanur, Bangalore (IN); Manigandan Ms, Bangalore (IN); Sateesh Kumar Potturu Naga Venkata, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/172,086

(22) Filed: Oct. 26, 2018

(65) Prior Publication Data

US 2020/0137231 A1 Apr. 30, 2020

(51) Int. Cl.

| H04M 3/00 | (2006.01) |
|---|---|
| H04M 5/00 | (2006.01) |
| H04M 3/523 | (2006.01) |
| H04M 3/51 | (2006.01) |
| H04L 12/66 | (2006.01) |
| G06Q 10/00 | (2012.01) |

(52) U.S. Cl.
CPC ....... *H04M 3/5232* (2013.01); *H04M 3/5175* (2013.01)

(58) Field of Classification Search
CPC ............. H04M 3/5175; H04M 3/5191; H04M 3/5183; H04M 2203/401; H04M 3/2218; H04M 3/5238; H04M 7/12; H04M 2201/40; H04M 3/5232; H04M 7/006; H04M 3/5166; H04M 2203/403; H04M 3/5233; H04M 3/523; H04M 2203/402;
(Continued)

(56) References Cited

U.S. PATENT DOCUMENTS 7,269,253 B1 9/2007 Wu et al.
7,913,063 B1 * 3/2011 Lyerly ................. H04M 3/5232
712/30
(Continued)

OTHER PUBLICATIONS

Kelly, "Afiniti Taps AI to Optimize Customer-Agent Pairing," www.nojitter.com, Dec. 18, 2017, 3 pages.
(Continued)

*Primary Examiner* — Ahmad F. Matar
*Assistant Examiner* — Kharye Pope
(74) *Attorney, Agent, or Firm* — Edell, Shapiro & Finnan, LLC

(57) ABSTRACT

A computer system routes contact center interactions. Interactions between contact center agents and contact center queries that are received at a contact center are monitored. A ranking model is trained according to the categories of the contact center queries and the interaction scores of each handled query using machine learning. The ranking model is tested according to various metrics to ensure that the ranking model ranks the agents according to one or more selected business outcomes. A net score may be determined for each contact center agent for each query category based on a predicted interaction score and one or more non-interaction features. Incoming queries may then be routed to an appropriate contact center agent based on the category of the incoming query. Embodiments may further include a method and program product for routing contact center interactions in substantially the same manner described above.

20 Claims, 6 Drawing Sheets

(58) Field of Classification Search
CPC ........ H04M 2203/556; H04M 3/42374; G10L 15/1822; G10L 15/1815; G10L 25/63; G10L 17/26; G06Q 10/06398; G06Q 10/063112; G06Q 10/06395; G06Q 10/1097; G06Q 10/0639; G06Q 10/06393; G06F 17/2785; G06F 17/2765; G06F 17/27
USPC ............ 379/265.06, 265.02, 265.01, 265.07, 379/265.12, 265.05, 266.01, 265.11, 379/265.13; 705/7.38, 7.41, 7.39, 7.42; 370/352
See application file for complete search history.

(56) References Cited

U.S. PATENT DOCUMENTS

| | | | | |
|---|---|---|---|---|
| 9,167,095 | B1* | 10/2015 | Selvin | H04M 3/5175 |
| 2010/0020959 | A1 | 1/2010 | Spottiswoode | |
| 2010/0266115 | A1* | 10/2010 | Fedorov | H04M 3/5232 |
| | | | | 379/265.12 |
| 2014/0079211 | A1* | 3/2014 | Flockhart | H04M 3/523 |
| | | | | 379/266.07 |
| 2014/0086402 | A1* | 3/2014 | Kan | H04M 3/5232 |
| | | | | 379/265.06 |
| 2014/0270133 | A1* | 9/2014 | Conway | H04M 3/5233 |
| | | | | 379/265.1 |
| 2016/0189164 | A1* | 6/2016 | Tolksdorf | G06Q 30/016 |
| | | | | 705/304 |
| 2016/0295019 | A1* | 10/2016 | O'Connor | H04M 3/5233 |
| 2016/0358115 | A1* | 12/2016 | Gustafson | G06Q 10/06395 |
| 2017/0149976 | A1* | 5/2017 | Conway | H04M 3/5233 |
| 2017/0243137 | A1 | 8/2017 | Mandel et al. | |
| 2018/0101529 | A1* | 4/2018 | Karpistsenko | G06F 30/20 |
| 2018/0191905 | A1* | 7/2018 | McCoy | G06Q 30/016 |
| 2019/0253558 | A1* | 8/2019 | Haukioja | H04M 3/5175 |

OTHER PUBLICATIONS

Kingston, "Agent Intelligence," www.docs.servicenow.com, Jul. 12, 2018, 4 pages.

* cited by examiner

CONTACT CENTER INTERACTION ROUTING USING MACHINE LEARNING

TECHNICAL FIELD

The present disclosure relates to interaction routing in a contact center.

BACKGROUND

A contact center refers to a facility that is staffed with call agents who handle inbound communications. Customers and end users typically call a contact center in order to receive support for goods and/or services. One area of difficulty in administrating a contact center is routing an inbound request to a particular call agent who can handle the request. While interaction routing can be automated to a degree using routing software, there is still manual effort to maintain and configure agents' expertise in order to determine which requests call agents can handle.

DESCRIPTION OF EXAMPLE EMBODIMENTS

Overview

The present disclosure relates to contact center interaction routing, and more specifically, to contact center interaction routing using machine learning. Conventional interaction routing software may require a great deal of effort to maintain, as an administrator may be required to manually define attributes of each contact center agent, such as an agent's areas of expertise. The embodiments presented utilize a machine learning-based agent routing approach that improves performance indicators while minimizing the amount of administration required. In particular, interactions between contact center agents and contact center queries that are received at a contact center are monitored. A ranking model is trained according to the categories of the contact center queries, one or more selected business outcomes, and the interaction scores of each agent for each handled query using machine learning. The ranking model is tested according to various metrics in order to gauge the performance of the ranking model. A net score may be determined for each contact center agent for each query category based on a predicted interaction score and one or more non-interaction features, including the category of the incoming query. Incoming queries may then be routed to an appropriate contact center agent based on the computed net score.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics presented herein may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Example Embodiments

Figure 1:
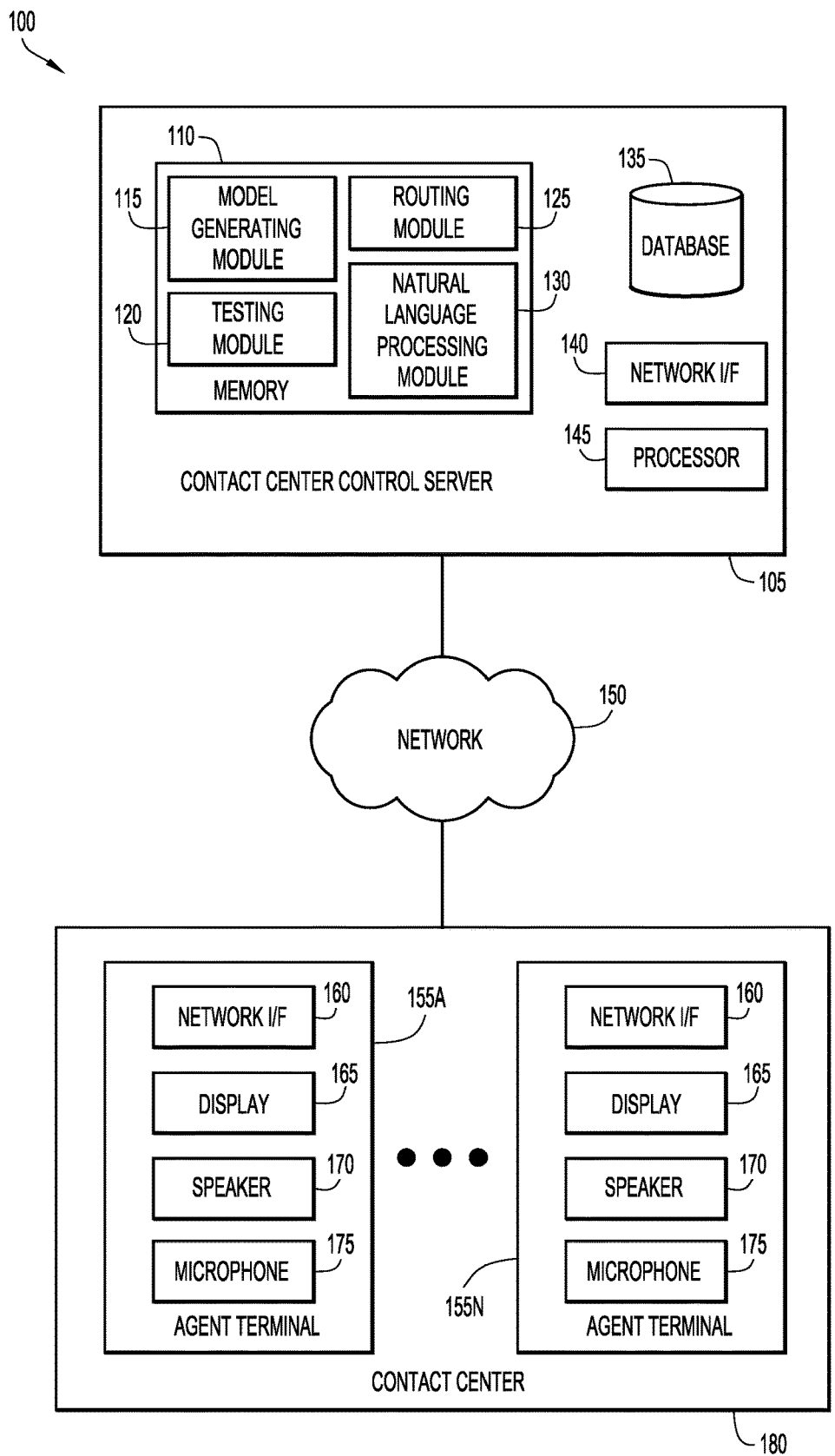
FIG. 1 is block diagram depicting a computing environment for routing contact center interactions in accordance with an example embodiment.

Embodiments are now be described in detail with reference to the figures. FIG. 1 is a block diagram depicting a computing environment 100 for machine-learning based contact center query routing. As depicted, computing environment 100 includes a contact center control server 105, a network 150, and a contact center 180 with a plurality of agent terminals 155. It is to be understood that the functional division among components of computing environment 100 have been chosen for purposes of explaining the embodiments and is not to be construed as a limiting example.

Contact center control server 105 includes memory 110, a database 135, a network interface 140, and at least one processor 145. Memory 110 stores software instructions for a model generating module 115, a testing module 120, a routing module 125, and a natural language processing module 130. Network interface 140 may include one or more network interface cards that enable the contact center control server 105 to send and receive data over a network, such as network 150. Contact center control server 105 may include internal and external hardware components, as depicted and described in further detail with respect to FIG. 5.

Model generating module 115, testing module 120, routing module 125, and natural language processing module 130 may include one or more modules or units to perform various functions of the embodiments described below. Model generating module 115, testing module 120, routing module 125, and natural language processing module 130 may be implemented by any combination of any quantity of software (and/or hardware modules or units), and may reside within memory 110 of contact center control server 105 for execution by a processor, such as processor 145.

Model generating module 115 may develop models that assign scores to each agent in contact center 180. Each agent may receive separate scores in a variety of contact center query categories. For example, in a contact center that offers technical support, queries categories may include "device not powering on," "connectivity issues," and the like, with an agent receiving a separate score for each category. Each score may indicate an agent's level of competence or capability of addressing queries in that query category.

In some embodiments, model generating module 115 utilizes conventional or other machine learning techniques to generate models that assign scores to agents by analyzing a dataset that includes interaction features and non-interaction features. As used herein, an interaction feature may refer to any description of an interaction between an agent of a contact center and a customer who calls the contact center with a query. Interaction features may include any data that may be generated after an interaction is resolved. For example, interaction features may include details such as total talk time (e.g., the duration of the interaction), hold time (e.g., the amount of time in which an individual calling the contact center is on hold), and customer satisfaction (CSAT) rating. CSAT ratings may be collected by conducting surveys with callers after the resolution of their queries. Non-interaction features may include data that is available before routing a query to an agent, such as the time of day, the customer's wait time before the customer is routed to an agent, the agent's idle time (e.g., the amount of time in which an agent is not engaged in an interaction), a sentiment of the customer, a customer context, and any language constraints.

In some embodiments, model generating module 115 generates an interaction score that is based on the interaction features of handled query, and a net score that is a function of the non-interaction features and the predicted interaction score of an agent. Model generating module 115 may produce a ranking model that ranks agents according to their predicted interaction scores in each query category. In some embodiments, the ranking model ranks agents according to one or more selected business outcomes, such as duration of interactions, CSAT, agent idle time, and the like. For example, if a contact center has an abundance of idle agents, an administrator can instruct model generating module 115 to generate a ranking model that routes interactions to agents in a manner that minimizes agent idle time.

Testing module 120 may test the efficacy of a ranking model in order to ensure that the ranking model properly ranks agents according to desired business outcomes. In some embodiments, testing module 120 performs one or more simulations of an agent ranking process and analyzes the results. Testing module 120 may test a ranking model by monitoring routed interactions and determining how well business outcomes are achieved, using actual agent profiles, test (e.g., dummy) profiles, or a combination thereof. Testing module 120 may then analyze the resulting agent-customer pairings to determine whether incoming interactions are being routed to the agents that are most highly rated for the selected business outcomes.

Routing module 125 may route incoming interactions to an agent according to the ranking model and non-interaction features. For example, if contact center control server 105 receives an incoming interaction having a query category of "general troubleshooting," then routing module 125 may select an idle agent who has a high (above some threshold) score in the general troubleshooting query category, and route the incoming interaction to that agent's agent terminal 155.

Natural language processing module 130 may use conventional or other natural language processing techniques in order to classify incoming communications according to one or more query categories. When a customer calls into a contact center, the customer may be prompted to state the nature of his or her call; natural language processing module 130 may process customer responses and select one or more query categories that correspond to the incoming query. Natural language processing module 130 may analyze factors such as a customer's manner of speech, tone, and word choice, in order to determine a customer sentiment. For example, natural language processing module 130 may determine that a customer is frustrated, angry, polite, optimistic, pessimistic, and the like.

Database 135 may include any non-volatile storage media known in the art. For example, database 135 can be implemented with a tape library, optical library, one or more independent hard disk drives, or multiple hard disk drives in a redundant array of independent disks (RAID). Similarly, data on database 135 may conform to any suitable storage architecture known in the art, such as a file, a relational database, an object-oriented database, and/or one or more tables. Database 135 may store data corresponding to interaction features and non-interaction features of each handled query, a list of query categories, agent-agent terminal assignments, and ranking models, including previously-used ranking models and currently-deployed ranking models.

Network 150 may include a local area network (LAN), a wide area network (WAN) such as the Internet, or a combination of the two, and includes wired, wireless, or fiber optic connections. In general, network 150 can use any combination of connections and protocols that will support communications between contact center control server 105 and agent terminals 155A-155N of contact center 180 via network interfaces.

Contact center 180 may include one or more agent terminals, such as agent terminals 155A-155N. Contact center 180 may correspond to one or more physical locations of a contact center. In some embodiments, contact center control server 105 is co-located with contact center 180.

Each agent terminal 155A-155N includes a network interface 160, display 165, speaker 170, and microphone 175. In various embodiments, an agent terminal may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 140 enables components of each agent terminal 155A-155N to send and receive data over a network, such as network 150. Each agent terminal 155A-155N may include internal and external hardware components, as depicted and described in further detail with respect to FIG. 5. An agent may utilize an agent terminal in order to address a query posed by a customer when an interaction is routed to the agent assigned to the agent terminal.

Display 165 may include any output device for presenting information in a visual form, such as a liquid crystal display (LCD), a cathode ray tube (CRT) display, or a light-emitting diode (LED) display. Speaker 170 may include any transducer capable of converting an electrical signal to sound, and microphone 175 may include any transducer capable of converting sound to an electrical signal. A contact center agent may converse with a customer via speaker 115 and microphone 120 during an interaction.

Figure 2A:
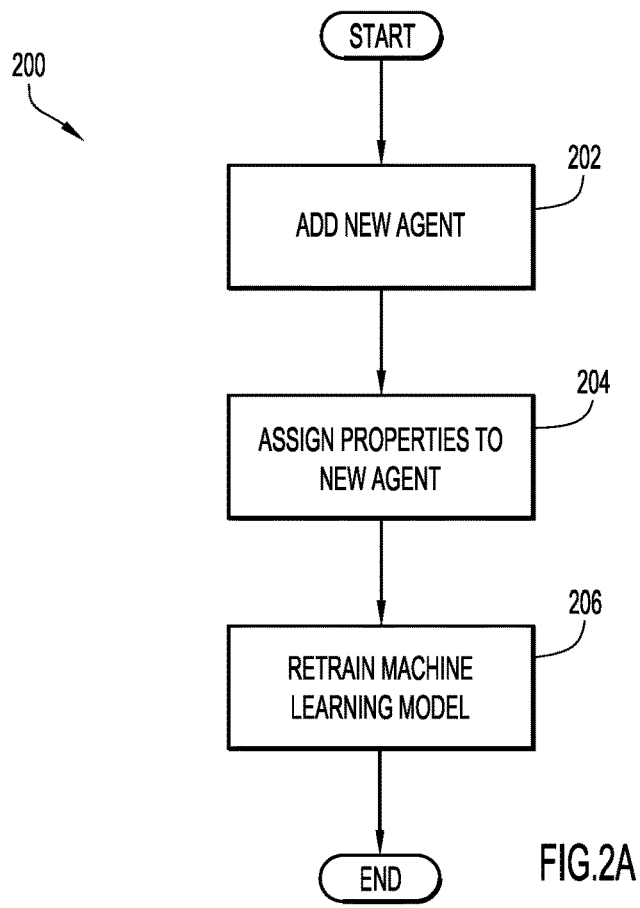
FIG. 2A is a flow chart depicting a method of adding an agent to a machine learning model in accordance with an example embodiment.

FIG. 2A is a flow chart depicting a method 200 of adding an agent to a machine learning model in accordance with an embodiment.

A new agent is added at operation 202. An administrator may add a new agent using an identifier, such as the new agent's name, serial number, or other identifier.

Properties are assigned to the agent at operation 204. An administrator may assign properties to the agent, such as the agent terminal to which the agent is assigned, the location of the agent, the agent's log-in credentials, languages spoken by the agent, and any known skills of the agent, if available.

The machine learning model is retrained at operation 206. Model generating module 115 and/or testing module 120 may retrain the machine learning model using a new set of agents that has been updated to include the newly-added agent. In some embodiments, retraining of the machine learning model is performed according to present embodiments described in further detail below with reference to FIGS. 3-5 below.

Figure 2B:
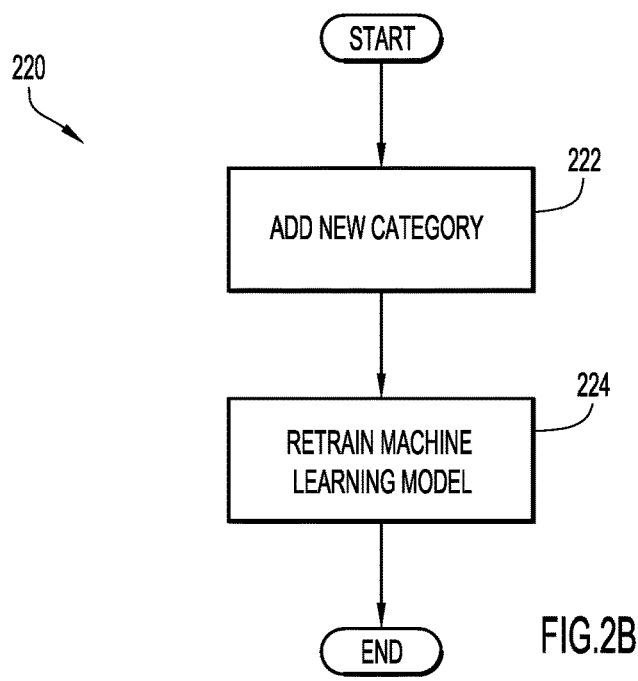
FIG. 2B is a flow chart depicting a method of adding a category to a machine learning model in accordance with an example embodiment.

FIG. 2B is a flow chart depicting a method 220 of adding a category to a machine learning model in accordance with an embodiment.

A new query category is added at operation 222. An administrator may add a new query category that describes a query at a desired level of granularity. For example, query categories can be general, such as "hardware problem" or "software problem," or more specific, such as "error 41 in messaging application" or "client is unable to refresh database view."

The machine learning model is retrained at operation 224. Model generating module 115 and/or testing module 120 may retrain the machine learning model using a new set of query categories that has been updated to include the newly-added query category. In some embodiments, retraining of the machine learning model is performed according to present embodiments discussed in further detail with reference to FIGS. 3-5 below.

Figure 2C:
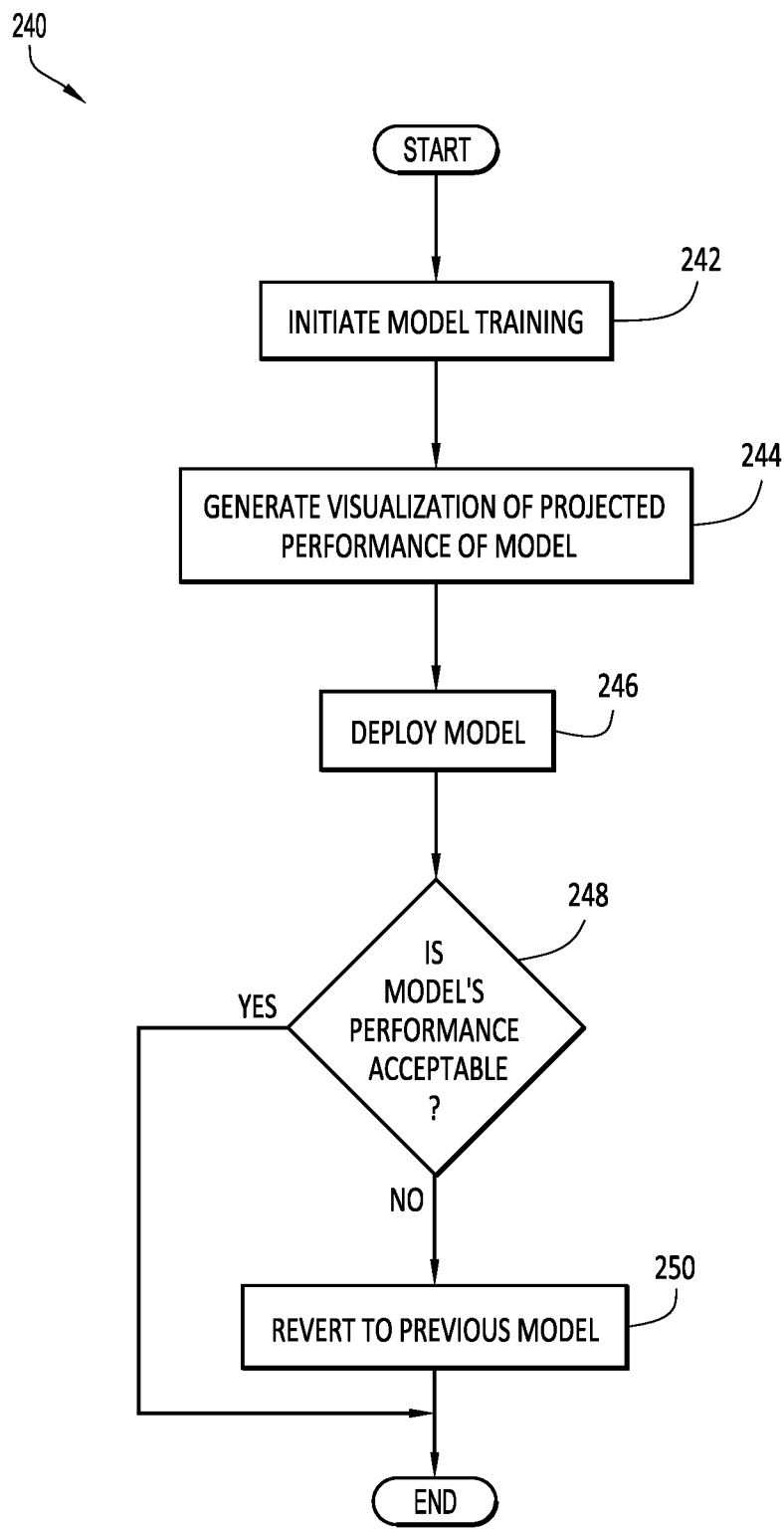
FIG. 2C is a flow chart depicting a method of deploying and upgrading a machine learning model in accordance with an example embodiment.

FIG. 2C is a flow chart depicting a method 240 of deploying and upgrading a machine learning model in accordance with an embodiment.

Model training is initiated at operation 242. A machine learning model may be trained using the interaction history of agents along with the corresponding query category of each interaction. The model may be trained according to conventional or other machine learning techniques, and learning may be supervised, unsupervised, or a combination thereof. The model may be trained to score agents for given query categories. In some embodiments, the model uses matrix factorization-based machine learning techniques. A natural language processing model may also be trained in order to classify incoming queries into query categories.

A visualization of the projected performance of the model is generated at operation 244. The visualization may indicate a ranking of agents according to one or more selected business outcomes, such as call duration, agent idle time, and CSAT score. An administrator may view the visualization in order to determine whether the model should be deployed. In some embodiments, the newly-trained model may be compared against other models, such as the currently-deployed model and/or previous models.

The model is deployed at operation 246. The model may be deployed to routing module 125 so that incoming queries can be routed according to the model. In some embodiments, when the model is deployed, the previous model is saved in database 135.

Operation 248 determines whether the model's performance is acceptable. Test metrics may be used to determine whether the model is meeting a particular level of performance for the selected business outcomes. In some embodiments, the model is determined to be acceptable when it outperforms a previous model according to one or more business outcomes. In addition or alternatively, an administrator may manually accept or discard the deployed model.

If the model's performance is acceptable, method 240 terminates; otherwise, method 240 proceeds to operation 250 and reverts to a previous model. The previous model may be a model that was in use immediately prior to the new model's deployment in operation 246, or may be another model, such as a designated model or a best-performing model (e.g., as determined according to one or more business outcomes).

Figure 3:
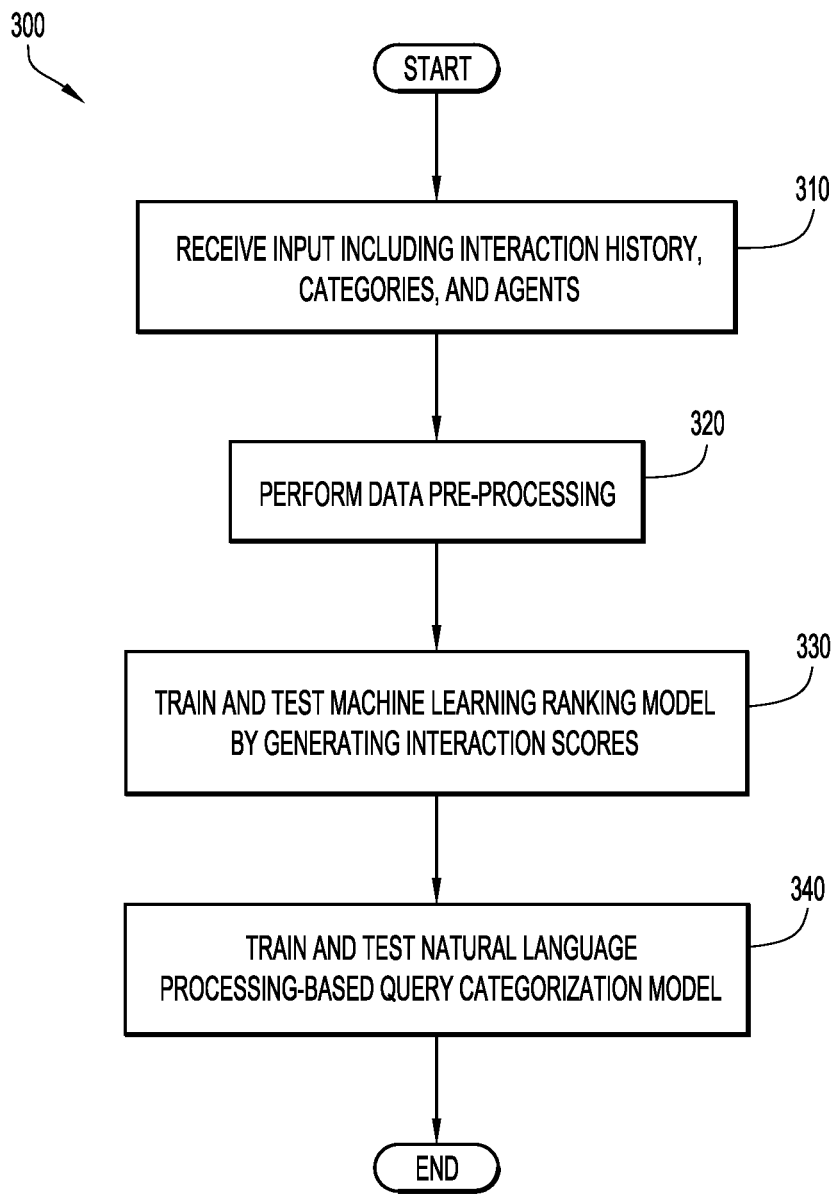
FIG. 3 is a flow chart depicting a method of training a machine learning model in accordance with an example embodiment.

FIG. 3 is a flow chart depicting a method 300 of training a machine learning model in accordance with an example embodiment.

Input, including interaction histories, query categories, and agents, is received at operation 310. Model generating module 115 may receive input in the form of interaction features and non-interaction features. Interaction features may include features that are generated upon conclusion of an interaction, such as talk time, hold time, and CSAT rating, whereas non-interaction features may include values that are known before an interaction, such as agent idle time, customer hold time, and customer sentiment. In some embodiments, the input is received by contact center control server 105 from agent terminals 155A-155N.

Data pre-processing is performed at operation 320. Model generating module 115 may perform pre-processing including data cleansing, normalizing, and any other pre-processing steps. For example, if some CSAT scores are on a five-point scale, and other CSAT scores are on a ten-point score, model generating module 115 may normalize the five-point scores to a ten-point score (or vice versa), while also eliminating any outliers, corrupt records, incomplete records, and the like.

The machine learning ranking model is trained and tested at operation 330 by generating interaction scores. Model generating module 115 may train the ranking model using conventional or other machine learning techniques. In some embodiments, the ranking model is trained using a machine learning approach based on matrix factorization, restricted Boltzmann machines, and/or singular value decomposition. Once model generating module 115 trains the ranking model, testing module 120 may test the model. Testing module 120 may test a model using testing metrics such as normalized discounted cumulative gain, $F_1$ scores, and/or top k metrics in order to ensure that agents are properly ranked according to their ability to achieve selected business outcomes.

The natural language processing-based query categorization model is trained and tested at operation 340. In some embodiments, natural language processing module 130 trains a query categorization model using conventional or other machine learning techniques to classify incoming queries according to one or more query categories. The query categorization model may be trained to classify queries based the words or phrases used by a customer when he or she describes the nature of the query. Testing module 120 may test a query categorization model by using a sample corpus of speech to determine how well various queries are categorized. In some embodiments, when a query categorization model classifies a query, the model provides a certainty value; testing module 120 may test the model to ensure that classifications meet a predetermined certainty value threshold. Additionally or alternatively, query categorization models may be built using recurrent neural networks and/or long short-term memory neural networks.

Figure 4:
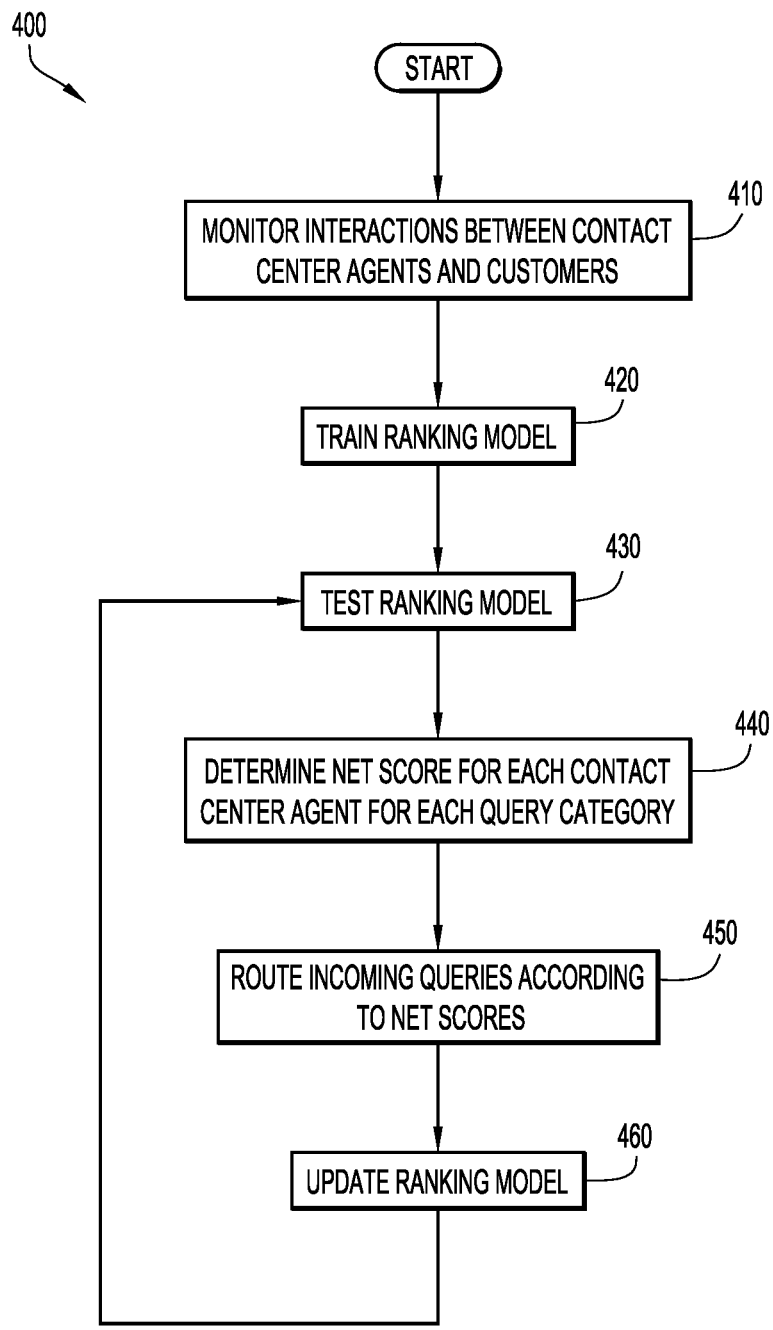
FIG. 4 is a flow chart depicting a method of routing contact center queries in accordance with an example embodiment.

FIG. 4 is a flow chart depicting a method 400 of routing queries in accordance with an example embodiment.

Interactions between contact center agents and customers is monitored at operation 410. Interaction features and non-interaction features may be collected over time. Interaction features may include talk time per interaction, hold time (e.g., amount of time in which a customer was on hold after having been routed to an agent), and CSAT rating by query category, and non-interaction features may include time of day, customer wait time, (e.g., amount of time that a customer waited to be routed to an agent), agent idle time, sentiment of customer, customer context, and language constraints. Each interaction may be monitored via the agent terminal 155 of the agent.

The ranking model is trained at operation 420. Model generating module 115 may perform data cleansing and normalization operations on the data collected at operation 410. An interaction score may be calculated for the handled query as a function of the interaction features. There may be a separate interaction score for each query. In some embodiments, the interaction score (IS) is calculated according to a linear function, such as equation (1):

$$IS = w_1 \times (1\text{-duration}) + w_2 \times CSAT + \ldots + w_n \times (\text{value of interaction feature } n) \quad (1)$$

wherein weights $w_1, w_2, \ldots w_n$ are hyperparameters, and their multiplicands are normalized values obtained from the corresponding interaction features. A higher interaction score may correspond to a better overall ranking in a given query category.

The ranking model is tested at operation 430. Testing module 120 may test the ranking module using test metrics, such as normalized discounted cumulative gain, $F_1$ scores, and/or top k metrics. The ranking model is expected to rank agents according to their ability to achieve business outcomes, with agents who are more successful in meeting business outcomes (e.g., higher CSAT scores, shorter durations of interactions, and the like) being ranked more highly.

A net score is determined for each contact center agent for each interaction at operation 440. The net score may be calculated by model generating module 115, and is a function of the interaction score and non-interaction features. Non-interaction features that affect a net score may include an agent's CSAT score at a particular time of day, an agent's CSAT score according to a particular customer sentiment, a customer's wait time, the agent's idle time. The CSAT scores may be time-decayed to emphasize more recent interactions. In some embodiments, the net score (NS) is calculated according to equation (2):

$$NS = pIS \times c^{(cwt + ait + CSAThour + CSATsentiment)} \quad (2)$$

with pIS representing a predicted interaction score of the agent, c being a value greater than 1, and close to 1, and ait referring to agent idle time (in seconds), which may be a negative value if the agent is currently busy. The predicted interaction score may be generated by the ranking model that is trained and tested in operations 420 and 430. Thus, each predicted interaction score is generated by calculating interaction scores for each query according to equation (1), training the model with the interaction scores, and using the trained model to produce predicted interaction scores. CSAThour may represent the average CSAT score that the agent has obtained at that hour of the day, and CSATsentiment may represent the average CSAT that the agent has obtained for a given sentiment. By using a net score that is a function of both a predicted interaction score as well as non-interaction features, interactions can be routed to agents who, for example, are more efficient at particular times of a day, are capable of handling irritating customers, are capable of conversing in a language understood by the customer, and the like. In some embodiments, a net score may be computed using a machine learning model, such as a neural network, that analyzes the degree to which business outcomes are met in agent-query pairings to predict scores.

Incoming queries are routed according to the net scores at operation 450. Natural language processing module 130 may determine a query category, and routing module 125 may use the ranking model to route queries to agents based on the net scores of agents in the determined query category. In some embodiments, routing module 125 uses two types of agent assignment: non-blocking assignments, and blocking assignments. A non-blocking assignment is a mode of assignment in which an incoming query may be routed to an agent whenever an agent is available for the given query category. Non-blocking assignments may use a reward matrix defined according to net scores of agents. In some embodiments, routing module 125 uses a Hungarian algorithm-based approach to make non-blocking assignments. A Hungarian algorithm may select optimal matches based on a highest net score. Tasks with a maximum net score may be assigned to an agent (e.g., m tasks:1 agent) or agents corresponding to a highest net score may be assigned a task (e.g., 1 task:n agents).

A blocking assignment may also match m tasks to n agents by reserving agents for some time before assigning the agents. A blocking assignment is an m:n assignment that happens every p seconds or until n queries arrive, or until m agents become available (or whichever is shorter). For example, agents X and Y may be available agents, with agent X being skilled in skills S1 and S2, and agent Y being skilled in skill S2, but not as skilled as agent X. When task T1 having category S2 is received, task T1 may be assigned to agent X, who outscores agent Y in skill S2. Next, when task T2 in category S1 is received, it cannot be assigned to agent Y, since agent Y has a lower net score than the specified threshold in category S1 (in fact, agent Y may not be skilled at all in skill S1). However, task T2 cannot be assigned to agent X, since agent X is occupied with task T1, assuming agent X cannot take more than one task or performs better when working with a single task. To prevent this, a blocking assignment approach may hold task T1 until task T2 arrives and then perform an assignment, matching agent X to task T2 and agent Y to task T1. In some embodiments, a blocking assignment may also use a reward matrix and a Hungarian algorithm to perform matching.

The ranking model is updated at operation 460. Feedback may be collected upon resolution of an interaction in order to update the ranking model. In some embodiments, the ranking model is continually updated by training the model with fresh feedback data. In order to determine whether an updated ranking model should replace a currently-deployed model, the two models may be compared using AB testing; if a new model reliably performs better than a deployed model, the new model may be deployed. Additionally, an administrator may be provided with performance metrics and suggestions, such as trending query categories, skills that are in high demand, and the like. For example, if a query category tends to require that an agent have skills in skill areas P, Q, and R, then routing module 125 may suggest to an administrator that agents who are skilled in skill areas P and Q be trained in skill area R as well. In some embodiments, skill training suggestions are generated according to conventional or other techniques based on k-means clustering. A ranking model may be updated to include any latent information that is discovered about agents, such as any skill levels or properties of an agent that were not known previously, but were discovered by analyzing interactions in which the agent was a participant. As the ranking model is continually updated, additional latent information may be discovered for each agent, thus enabling successive ranking models to route interactions more effectively.

Figure 5:
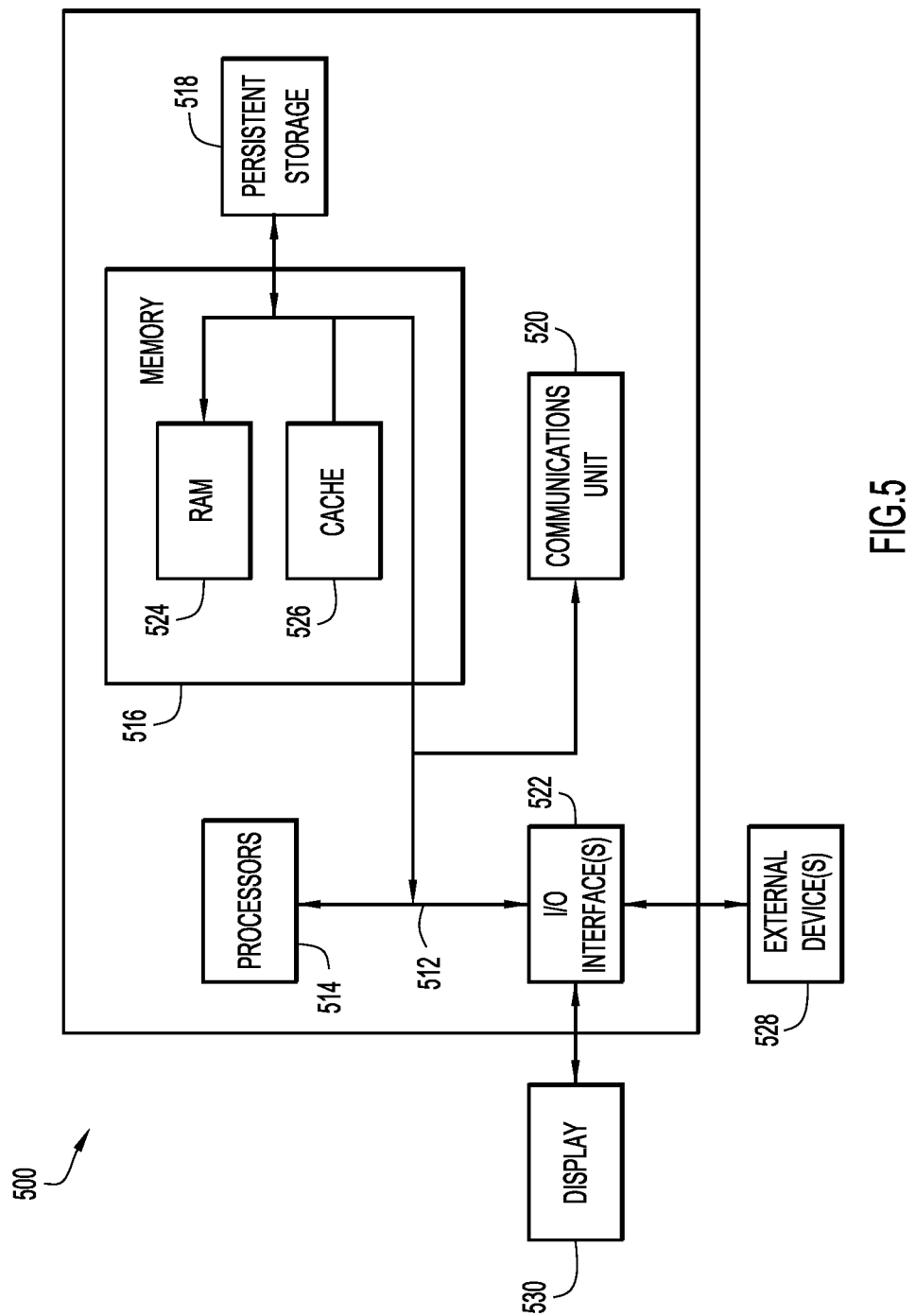
FIG. 5 is a block diagram depicting a computing device configured to perform the methods presented herein in accordance with an example embodiment.

FIG. 5 is a block diagram depicting components of a computer 500 suitable for executing the methods disclosed herein. Computer 500 may implement contact center control server 105 and/or agent terminals 155A-155N in accordance with embodiments presented herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 512, which provides communications between computer processor(s) 514, memory 516, persistent storage 518, communications unit 520, and input/output (I/O) interface(s) 522. Communications fabric 512 can be implemented with any architecture designed for passing data and/or control information between processors (such as microprocessors, communications and network processors, etc.), system memory, peripheral devices, and any other hardware components within a system. For example, communications fabric 512 can be implemented with one or more buses.

Memory 516 and persistent storage 518 are computer readable storage media. In the depicted embodiment, memory 516 includes random access memory (RAM) 524 and cache memory 526. In general, memory 516 can include any suitable volatile or non-volatile computer readable storage media.

One or more programs may be stored in persistent storage 518 for execution by one or more of the respective computer processors 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface cards. Communications unit 520 may provide communications through the use of either or both physical and wireless communications links.

I/O interface(s) 522 allows for input and output of data with other devices that may be connected to computer 500. For example, I/O interface 522 may provide a connection to external devices 528 such as a keyboard, keypad, a touch screen, and/or some other suitable input device. External devices 528 can also include portable computer readable storage media such as, for example, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to contact center interaction routing (e.g., interaction feature data, non-interaction feature data, query category data, agent data, etc.) may be stored within any conventional or other data structures (e.g., files, arrays, lists, stacks, queues, records, etc.) and may be stored in any desired storage unit (e.g., database, data or other repositories, queue, etc.). The data transmitted between contact center control server 105 and agent terminals 155A-155N may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to contact center interaction routing (e.g., interaction feature data, non-interaction feature data, query category data, agent data, etc.) may include any information provided to, or generated by, contact center control server 105 and/or any agent terminal 155 of contact center 180. Data relating to contact center interaction routing may include any desired format and arrangement, and may include any quantity of any types of fields of any size to store any desired data. The data relating to contact center interaction routing may include any data collected about entities by any collection means, any combination of collected information, and any information derived from analyzing collected information.

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of routing contact center interactions using machine learning.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software (e.g., model generating module 115, testing module 120, routing module 125, natural language processing module 130, etc.) of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments (e.g., model generating module 115, testing module 120, routing module 125, natural language processing module 130, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the form disclosed. Many modifications and variations will be apparent to those of ordinary skill in the art without departing from the scope and spirit of the embodiments presented herein. The embodiment was chosen and described in order to best explain the principles of the embodiments and the practical application, and to enable others of ordinary skill in the art to understand the various embodiments with various modifications as are suited to the particular use contemplated.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In summary, in one form, a computer-implemented method is provided comprising: at a contact center control server associated with a contact center that includes a plurality of agent terminals at which contact center agents serve contact center queries: monitoring over time interactions between contact center agents and contact center queries received at the contact center; training a ranking model according to one or more contact center query categories and corresponding interaction scores of each contact center query, wherein an interaction score corresponds to a resolution of a contact center interaction, and wherein the ranking model utilizes machine learning to score each contact center agent for a given contact center query; testing the ranking model using one or more test metrics to determine that the ranking model ranks the plurality of agents according to one or more selected business outcomes; determining a net score for each contact center agent for each contact center query category according to a predicted interaction score and one or more non-interaction features of each query, wherein the non-interaction features are features that are available before routing a contact center query; and routing each incoming contact center query to a contact center agent according to the net score of the contact center agent for the incoming query category.

The one or more test metrics may comprise one or more of: a normalized discounted cumulative gain metric, an F1 score, and a top K metric. The one or more non-interaction features may comprise one or more of: average customer satisfaction scores by hour, average customer satisfaction scores by sentiment, customer wait time, and contact center agent idle time. The one or more selected business outcomes may include one or more of a call duration, a customer satisfaction score, and contact center agent idle time.

The routing operate may comprise routing an incoming query to a contact center agent every n seconds or until m contact center agents become available. The routing operation may comprise routing an incoming query to a contact center agent when n incoming queries arrive or until m contact center agents become available.

The method may further include updating the ranking model to provide latent information for one or more agents. Updating the ranking model may comprise comparing the ranking model against an older model to determine that the older model is outperformed.

As explained above, the predicted interaction score is generated by the ranking model.

In another form, an apparatus is provided comprising: one or more computer processors; one or more computer readable storage media; program instructions stored on the one or more computer readable storage media for execution by at least one of the one or more computer processors, the program instructions comprising instructions to, on behalf of a contact center control server associated with a contact center that includes a plurality of agent terminals at which contact center agents serve contact center queries: monitor over time interactions between contact center agents and contact center queries received at the contact center; train a ranking model according to one or more contact center query categories and corresponding interaction scores of each contact center query, wherein an interaction score corresponds to a resolution of a contact center interaction, and wherein the ranking model utilizes machine learning to score each contact center agent for a given contact center query; test the ranking model using one or more test metrics to determine that the ranking model ranks the plurality of agents according to one or more selected business outcomes; determine a net score for each contact center agent for each contact center query category according to a predicted interaction score and one or more non-interaction features of each query, wherein the non-interaction features are features that are available before routing a contact center query; and route each incoming contact center query to a contact center agent according to the net score of the contact center agent for the incoming query category.

In still another form, one or more non-transitory computer readable storage media is provided, encoded with instructions that, when executed by a processor, cause the processor to: at a contact center control server associated with a contact center that includes a plurality of agent terminals at which contact center agents serve contact center queries: monitor over time interactions between contact center agents and contact center queries received at the contact center; train a ranking model according to one or more contact center query categories and corresponding interaction scores of each contact center query, wherein an interaction score corresponds to a resolution of a contact center interaction, and wherein the ranking model utilizes machine learning to score each contact center agent for a given contact center query; test the ranking model using one or more test metrics to determine that the ranking model ranks the plurality of agents according to one or more selected business outcomes; determine a net score for each contact center agent for each contact center query category according to a predicted interaction score and one or more non-interaction features of each query, wherein the non-interaction features are features that are available before routing a contact center query; and route each incoming contact center query to a contact center agent according to the net score of the contact center agent for the incoming query category.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
at a contact center control server associated with a contact center that includes a plurality of agent terminals at which contact center agents serve contact center queries:
monitoring over time interactions between contact center agents and contact center queries received at the contact center;
training a ranking model according to one or more contact center query categories and corresponding interaction scores of each contact center query, wherein an interaction score corresponds to a resolution of a contact center interaction, and wherein the ranking model utilizes machine learning to score each contact center agent for a given contact center query;
testing the ranking model using one or more test metrics to determine that the ranking model ranks the plurality of agents according to one or more selected business outcomes;
determining a net score for each contact center agent for each contact center query category according to a predicted interaction score and one or more non-interaction features of each query, wherein the net score is based on the predicted interaction score multiplied by a value based on a customer wait time, an agent idle time in seconds, an average customer satisfaction score for a given agent in a last hour, and an average customer satisfaction score for the given agent for a given sentiment; and
routing each incoming contact center query to a contact center agent according to the net score of the contact center agent for the contact center query category of the incoming contact center query.

2. The method of claim 1, wherein the one or more test metrics comprise one or more of: a normalized discounted cumulative gain metric, and an F1 score.

3. The method of claim 1, wherein the one or more non-interaction features further comprise one or more of: average customer satisfaction scores by hour, and average customer satisfaction scores by sentiment.

4. The method of claim 1, wherein the one or more selected business outcomes include one or more of a call duration, a customer satisfaction score, and contact center agent idle time.

5. The method of claim 1, wherein routing comprises routing an incoming query to a contact center agent every n seconds or when m incoming queries arrive.

6. The method of claim 1, further comprising updating the ranking model to provide latent information for one or more agents.

7. The method of claim 1, wherein updating the ranking model comprises comparing the ranking model against an older model to determine that the older model is outperformed.

8. The method of claim 1, wherein the predicted interaction score is generated by the ranking model.

9. An apparatus comprising:
one or more computer processors;
one or more computer readable storage media;
program instructions stored on the one or more computer readable storage media for execution by at least one of the one or more computer processors, the program instructions comprising instructions to, on behalf of a contact center control server associated with a contact center that includes a plurality of agent terminals at which contact center agents serve contact center queries:
monitor over time interactions between contact center agents and contact center queries received at the contact center;
train a ranking model according to one or more contact center query categories and corresponding interaction scores of each contact center query, wherein an interaction score corresponds to a resolution of a contact center interaction, and wherein the ranking model utilizes machine learning to score each contact center agent for a given contact center query;
test the ranking model using one or more test metrics to determine that the ranking model ranks the plurality of agents according to one or more selected business outcomes;
determine a net score for each contact center agent for each contact center query category according to a predicted interaction score and one or more non-interaction features of each query, wherein the net score is based on the predicted interaction score multiplied by a value based on a customer wait time, an agent idle time in seconds, an average customer satisfaction score for a given agent in a last hour, and an average customer satisfaction score for the given agent for a given sentiment; and
route each incoming contact center query to a contact center agent according to the net score of the contact center agent for the contact center query category of the incoming contact center query.

10. The apparatus of claim 9, wherein the one or more test metrics comprise one or more of: a normalized discounted cumulative gain metric, and an F1 score.

11. The apparatus of claim 9, wherein the one or more non-interaction features further comprise one or more of: average customer satisfaction scores by hour, and average customer satisfaction scores by sentiment.

12. The apparatus of claim 9, wherein the one or more selected business outcomes include one or more of a call duration, a customer satisfaction score, and contact center agent idle time.

13. The apparatus of claim 9, wherein routing comprises routing an incoming query to a contact center agent every n seconds or when m incoming queries arrive.

14. One or more non-transitory computer readable storage media encoded with instructions that, when executed by a processor, cause the processor to:
at a contact center control server associated with a contact center that includes a plurality of agent terminals at which contact center agents serve contact center queries:
monitor over time interactions between contact center agents and contact center queries received at the contact center;
train a ranking model according to one or more contact center query categories and corresponding interaction scores of each contact center query, wherein an interaction score corresponds to a resolution of a contact center interaction, and wherein the ranking model utilizes machine learning to score each contact center agent for a given contact center query;
test the ranking model using one or more test metrics to determine that the ranking model ranks the plurality of agents according to one or more selected business outcomes;
determine a net score for each contact center agent for each contact center query category according to a predicted interaction score and one or more non-interaction features of each query, wherein the net score is based on the predicted interaction score multiplied by a value based on a customer wait time, an agent idle time in seconds, an average customer satisfaction score for a given agent in a last hour, and an average customer satisfaction score for the given agent for a given sentiment; and
route each incoming contact center query to a contact center agent according to the net score of the contact center agent for the contact center query category of the incoming contact center query.

15. The one or more non-transitory computer readable storage media of claim 14, wherein the one or more test metrics comprise one or more of: a normalized discounted cumulative gain metric, and an F1 score.

16. The one or more non-transitory computer readable storage media of claim 14, wherein the one or more non-interaction features further comprise one or more of: average customer satisfaction scores by hour, and average customer satisfaction scores by sentiment.

17. The one or more non-transitory computer readable storage media of claim 14, wherein routing comprises routing an incoming query to a contact center agent every n seconds or when m incoming queries arrive.

18. The method of claim 1, wherein the net score comprises a predicted interaction score multiplied by $c^{(cwt+ait+CSAThour+CSATsentiment)}$, wherein c is a number having a value greater than 1, ait is the agent idle time in seconds, CSAThour is the average customer satisfaction score for a given agent in a last hour, and CSATsentiment is the average customer satisfaction score for the given agent for a given sentiment.

19. The apparatus of claim 9, wherein the net score comprises a predicted interaction score multiplied by $c^{(cwt+ait+CSAThour+CSATsentiment)}$, wherein c is a number having a value greater than 1, ait is the agent idle time in seconds, CSAThour is the average customer satisfaction score for a given agent in a last hour, and CSATsentiment is the average customer satisfaction score for the given agent for a given sentiment.

20. The one or more non-transitory computer readable storage media of claim 14, wherein the net score comprises a predicted interaction score multiplied by $c^{(cwt+ait+CSAThour+CSATsentiment)}$, wherein c is a number having a value greater than 1, ait is the agent idle time in seconds, CSAThour is the average customer satisfaction score for a given agent in a last hour, and CSATsentiment is the average customer satisfaction score for the given agent for a given sentiment.

* * * * *